(12) United States Patent
Kim et al.

(10) Patent No.: US 8,853,344 B2
(45) Date of Patent: Oct. 7, 2014

(54) LIQUID CRYSTALLINE POLYMER COMPOSITION FOR FILMS

(71) Applicant: Ticona LLC, Florence, KY (US)

(72) Inventors: Young Shin Kim, Florence, KY (US); Xinyu Zhao, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/032,271

(22) Filed: Sep. 20, 2013

(65) Prior Publication Data

US 2014/0135469 A1   May 15, 2014

Related U.S. Application Data

(60) Provisional application No. 61/724,344, filed on Nov. 9, 2012, provisional application No. 61/778,859, filed on Mar. 13, 2013.

(51) Int. Cl.

| C08G 63/02 | (2006.01) |
|---|---|
| C09K 19/38 | (2006.01) |
| C09K 19/02 | (2006.01) |
| C08G 63/60 | (2006.01) |
| B29D 7/01 | (2006.01) |
| C08G 64/00 | (2006.01) |

(52) U.S. Cl.
CPC ............. C08G 63/605 (2013.01); C09K 19/38 (2013.01); C09K 19/02 (2013.01); C09K 19/3809 (2013.01); C09K 2219/03 (2013.01); B29D 7/01 (2013.01)
USPC ........... 528/272; 428/422; 528/193; 528/194; 528/271

(58) Field of Classification Search
USPC ................... 428/422; 528/193, 194, 271, 272
See application file for complete search history.

(56) References Cited

U.S. PATENT DOCUMENTS

| 4,161,470 A | 7/1979 | Calundann |
|---|---|---|
| 4,626,557 A | 12/1986 | Duksa et al. |
| 4,741,955 A | 5/1988 | Saito et al. |
| 4,851,467 A | 7/1989 | Frayer |
| 4,922,811 A | 5/1990 | Stumpf |
| 4,966,807 A | 10/1990 | Harvey et al. |
| 5,015,723 A | 5/1991 | Suguniti et al. |
| 5,091,138 A | 2/1992 | Ishii et al. |
| 5,141,985 A | 8/1992 | Asai et al. |
| 5,288,529 A | 2/1994 | Harvey et al. |
| 5,300,747 A | 4/1994 | Simon |
| 5,331,135 A | 7/1994 | Ovadia |
| 5,399,656 A | 3/1995 | Nitta et al. |
| 5,428,100 A | 6/1995 | Asai et al. |
| 5,508,374 A | 4/1996 | Lee et al. |
| 5,529,716 A | 6/1996 | Nomura et al. |
| 5,589,236 A | 12/1996 | Harvey et al. |
| 5,624,984 A | 4/1997 | Furuta et al. |
| 5,643,988 A | 7/1997 | Nakamura et al. |
| 5,663,276 A | 9/1997 | Yoneta et al. |
| 5,767,195 A | 6/1998 | Furuta et al. |
| 5,820,780 A | 10/1998 | Furuta et al. |
| 5,830,940 A | 11/1998 | Nakamura et al. |
| 5,845,805 A | 12/1998 | Ragland |
| 5,847,039 A | 12/1998 | Nagashima et al. |
| 5,891,532 A | 4/1999 | Furuta et al. |
| 5,921,173 A | 7/1999 | Grycan et al. |
| 5,976,406 A | 11/1999 | Nagano et al. |
| 5,981,007 A | 11/1999 | Rubin et al. |
| 5,981,411 A | 11/1999 | Brown |
| 5,997,765 A | 12/1999 | Furuta et al. |
| 5,998,005 A | 12/1999 | Kanno |
| 6,045,737 A | 4/2000 | Harvey et al. |
| 6,051,664 A | 4/2000 | Nagashima et al. |
| 6,114,492 A | 9/2000 | Linstid, III et al. |
| 6,121,369 A | 9/2000 | Stack et al. |
| 6,124,004 A | 9/2000 | Furuta et al. |
| 6,140,455 A | 10/2000 | Nagashima et al. |
| 6,177,500 B1 | 1/2001 | Okamoto et al. |
| 6,194,524 B1 | 2/2001 | Nagashima et al. |
| 6,279,469 B1 | 8/2001 | Bailey |
| 6,294,643 B1 | 9/2001 | Harada et al. |
| 6,296,930 B1 | 10/2001 | Ohbe et al. |
| 6,333,393 B1 | 12/2001 | Harada |
| 6,376,076 B1 | 4/2002 | Ohbe et al. |
| 6,468,665 B1 | 10/2002 | Nagashima et al. |
| 6,495,616 B2 | 12/2002 | Maeda |
| 6,514,611 B1 | 2/2003 | Shepherd et al. |
| 6,528,164 B1 | 3/2003 | Ohbe et al. |
| 6,582,625 B2 | 6/2003 | Nagashima et al. |

(Continued)

FOREIGN PATENT DOCUMENTS

| EP | 0 814 129 A2 | 12/1997 |
|---|---|---|
| EP | 0 814 129 A3 | 12/1997 |

(Continued)

OTHER PUBLICATIONS

Abstract of Belgium Patent—BE1010788, Jan. 5, 1999, 1 page.

(Continued)

*Primary Examiner* — Terressa Boykin
(74) *Attorney, Agent, or Firm* — Dority & Manning, P.A.

(57) ABSTRACT

A film formed from a polymer composition containing one or more thermotropic liquid crystalline polymers is provided. The specific nature of the polymer or blend of polymers is selectively controlled so that the resulting polymer composition possesses both a low viscosity and high melt strength. The present inventor has discovered that this unique combination of thermal properties results in a composition that is both highly melt processible and stretchable, which allows the resulting film to be oriented to a degree greater than previously thought possible.

22 Claims, 2 Drawing Sheets

(56) References Cited

U.S. PATENT DOCUMENTS

| | | |
|---|---|---|
| 6,627,239 B1 | 9/2003 | Gavie et al. |
| 6,649,730 B2 | 11/2003 | Okamoto et al. |
| 6,656,386 B2 | 12/2003 | Suenaga et al. |
| 6,656,578 B2 | 12/2003 | Ohbe et al. |
| 6,733,691 B2 | 5/2004 | Nagano et al. |
| 6,774,203 B1 | 8/2004 | Fukute |
| 6,814,905 B1 | 11/2004 | Dalgewicz et al. |
| 6,881,937 B2 | 4/2005 | Swiontek |
| 6,890,988 B2 | 5/2005 | Hosoda et al. |
| 6,894,141 B2 | 5/2005 | Satoh et al. |
| 6,942,120 B2 | 9/2005 | Trent et al. |
| 6,986,864 B2 | 1/2006 | Porter |
| 7,014,921 B2 | 3/2006 | Okamoto et al. |
| 7,022,413 B2 | 4/2006 | Katagiri et al. |
| 7,063,892 B2 | 6/2006 | Okamoto et al. |
| 7,094,359 B2 | 8/2006 | Okamoto et al. |
| 7,105,106 B2 | 9/2006 | Samuels et al. |
| 7,128,862 B2 | 10/2006 | Wang |
| 7,179,401 B2 | 2/2007 | Ueno et al. |
| 7,244,807 B2 | 7/2007 | Ohtomo et al. |
| 7,258,246 B2 | 8/2007 | Tingley |
| 7,304,121 B2 | 12/2007 | Kato et al. |
| 7,393,467 B2 | 7/2008 | Asahara et al. |
| 7,482,053 B2 | 1/2009 | Swiontek |
| 7,531,222 B2 | 5/2009 | Terada et al. |
| 7,550,093 B2 | 6/2009 | Seo et al. |
| 7,618,552 B2 | 11/2009 | Hosoda et al. |
| 7,641,814 B2 | 1/2010 | Lynch et al. |
| 7,775,392 B2 | 8/2010 | Millsap et al. |
| 7,816,014 B2 | 10/2010 | Ito et al. |
| 7,820,304 B2 | 10/2010 | Groll |
| 7,842,760 B2 | 11/2010 | Yonezawa et al. |
| 7,850,035 B2 | 12/2010 | Lion et al. |
| 7,861,886 B2 | 1/2011 | Lion et al. |
| 8,044,151 B2 | 10/2011 | Asahara et al. |
| 8,178,646 B2 | 5/2012 | Kohinata et al. |
| 8,202,448 B2 | 6/2012 | Fukuhara et al. |
| 8,231,805 B2 | 7/2012 | Fukuhara et al. |
| 8,231,807 B2 | 7/2012 | Yonezawa et al. |
| 8,337,719 B2 | 12/2012 | Hosoda et al. |
| 8,470,962 B2 | 6/2013 | Nelson |
| 8,642,102 B2 | 2/2014 | Field et al. |
| 2003/0148010 A1 | 8/2003 | Keese et al. |
| 2004/0135118 A1 | 7/2004 | Waggoner |
| 2005/0145623 A1 | 7/2005 | Pool, III et al. |
| 2006/0014876 A1 | 1/2006 | Bushelman et al. |
| 2006/0230947 A1 | 10/2006 | Poppe |
| 2008/0125547 A1 | 5/2008 | Swogger et al. |
| 2008/0223860 A1 | 9/2008 | Rutherford et al. |
| 2008/0264935 A1 | 10/2008 | Rutherford et al. |
| 2012/0021212 A1 | 1/2012 | Hofmann et al. |

FOREIGN PATENT DOCUMENTS

| | | |
|---|---|---|
| EP | 0 846 419 A1 | 6/1998 |
| EP | 1 359 188 A2 | 12/2003 |
| EP | 1 359 188 A3 | 12/2003 |
| EP | 0 801 113 B1 | 2/2004 |
| EP | 1 526 093 A2 | 4/2005 |
| EP | 1 526 093 A3 | 4/2005 |
| EP | 1 527 687 A1 | 5/2005 |
| EP | 1 472 084 B1 | 4/2011 |
| GB | 2 007 142 A | 5/1979 |
| GB | 2 406 259 A | 3/2005 |
| GB | 2 406 489 A | 3/2005 |
| GB | 2 407 153 A | 4/2005 |
| GB | 2 423 693 B | 1/2008 |
| WO | WO 9533803 A1 | 12/1995 |
| WO | WO 9627492 A1 | 9/1996 |
| WO | WO 2004007590 A1 | 1/2004 |
| WO | WO 2004058851 A1 | 7/2004 |

OTHER PUBLICATIONS

Abstract of Chinese Patent—CN101429342, May 13, 2009, 1 page.
Abstract of European Patent—EP1537189, Jun. 8, 2005, 1 page.
Abstract of German Patent—DE19954061, May 18, 2000, 1 page.
Abstract of Japanese Patent—JPS6178862 Apr. 22, 1986, 2 pages.
Abstract of Japanese Patent—JPS3270760, Nov. 8, 1988, 2 pages.
Abstract of Japanese Patent—JPH023430, Jan. 9, 1990, 2 pages.
Abstract of Japanese Patent—JPH04166320, Jun. 12, 1992, 1 page.
Abstract of Japanese Patent—JPH05186614, Jul. 27, 1993. 2 pages.
Abstract of Spanish Patent—ES2278518, Jul. 1, 2008, 1 page.
Abstract of Spanish Patent—ES2336742, Apr. 15, 2010, 1 page.
Abstract of WO Patent—WO2009152764A1—Dec. 23, 2009, 1 page.
Article—Richard W. Lusignea, "Orientation of LCP Blown Film with Rotating Discs," *Polymer Engineering and Science*, vol. 39, Issue 12, Dec. 1, 1999, 5 pages.
Paper—Zhang et al., "The Processing and Assembly of Liquid Crystalline Polymer Printed Circuits," Auburn University, Foster Miller, Inc., and Rogers Corporation, 9 pages.
Search Report and Written Opinion for PCT/2013/060789 dated Dec. 18, 2013, 13 pages.
Related U.S. Patent Application Form.

LIQUID CRYSTALLINE POLYMER COMPOSITION FOR FILMS

RELATED APPLICATIONS

The present application claims priority to U.S. Provisional Application Ser. Nos. 61/724,344 (filed on Nov. 9, 2012) and 61/778,859 (filed on Mar. 13, 2013), which are incorporated herein in their entirety by reference thereto.

BACKGROUND OF THE INVENTION

Films formed from liquid crystal polymers ("LCP") can offer excellent properties for a wide variety of applications. For example, such films can serve as a barrier to both oxygen and moisture, thus rending them useful in packaging applications, such as for food, medical, and electronic products. Despite their beneficial properties, problems have nevertheless been experienced in using LCP films due to their weak tear strength in the machine direction. In an attempt to overcome these problems, one approach that has been suggested involves the use of a rotating die that orients the film in multiple directions as it is formed. While such multi-axial orientation should theoretically improve tear strength and thus result in more isotropic mechanical properties, the use of this technology has been limited due to the slow speeds that are normally required to process the polymer, which renders the process inefficient and overly costly.

As such, a need currently exists for an improved liquid crystalline polymer composition that can be more readily formed into films that are generally isotropic in nature.

SUMMARY OF THE INVENTION

In accordance with one embodiment of the present invention, a film is disclosed that comprises a polymer composition that includes a thermotropic liquid crystalline polymer. The polymer composition has a melt viscosity of from about 35 to about 500 Pa-s (determined in accordance with ISO Test No. 11443 at 15° C. higher than the melting temperature of the composition and at a shear rate of 400 seconds$^{-1}$), a maximum engineering stress of from about 340 kPa to about 600 kPa (determined at the melting temperature of the composition with an extensional viscosity fixture and a rotational rheometer), and a melting temperature of from about 300° C. to about 400° C.

In accordance with another embodiment of the present invention, a method for forming a film is disclosed. The method comprises melt processing a polymer composition such as described above, supplying the melt processed composition to a die, and blowing the melt processed composition into a bubble within the die, which is then collapsed to form the film.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
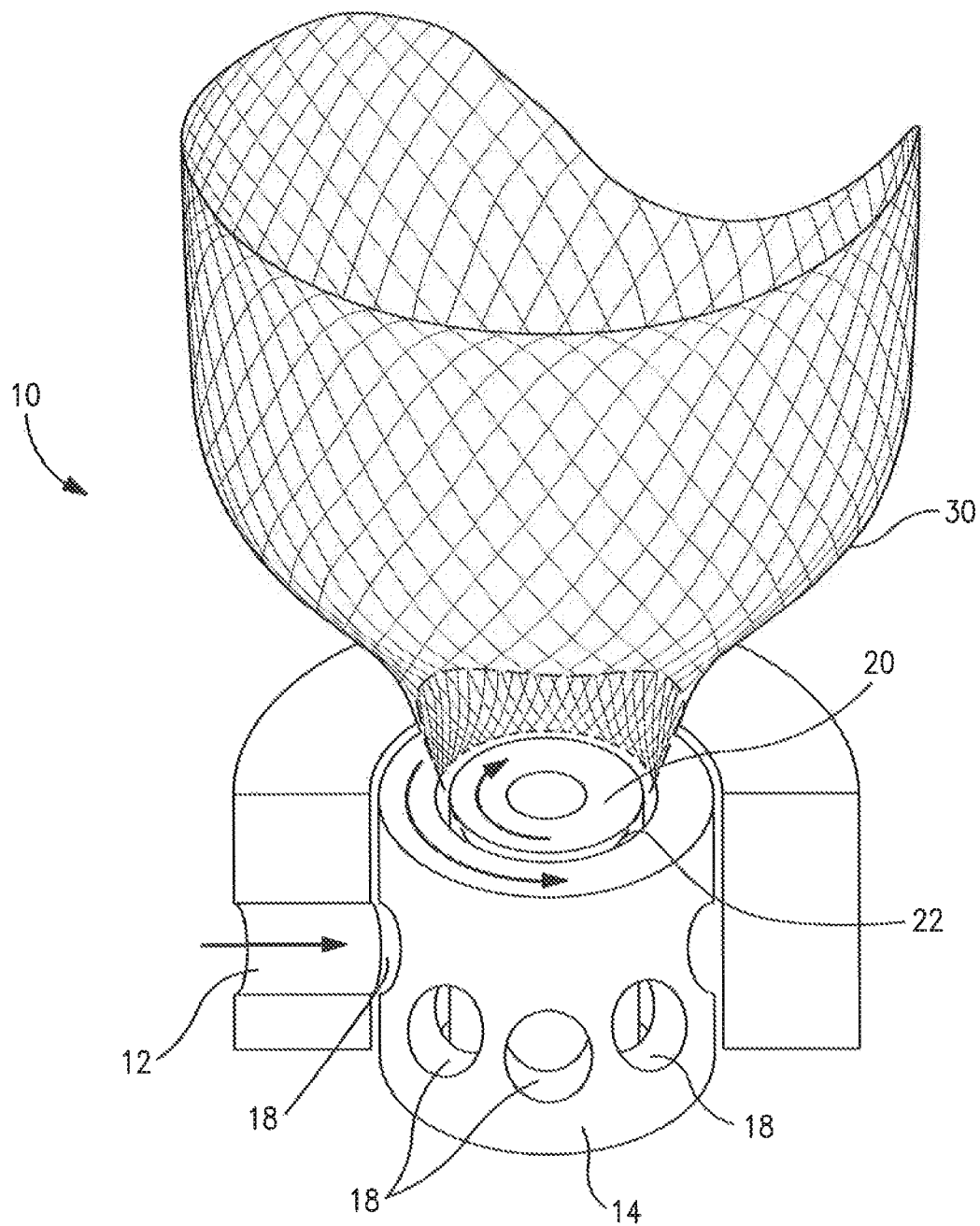
FIG. 1 is an exploded perspective view of one embodiment of a counter-rotating die that can be used to form a blown film from the polymer composition of the present invention.

It is to be understood by one of ordinary skill in the art that the present discussion is a description of exemplary embodiments only, and is not intended as limiting the broader aspects of the present invention.

Generally speaking, the present invention is directed to a film that is formed from a polymer composition containing one or more thermotropic liquid crystalline polymers. The specific nature of the polymer or blend of polymers is selectively controlled so that the resulting polymer composition possesses both a low viscosity and high melt strength. The present inventor has discovered that this unique combination of thermal properties results in a composition that is both highly melt processable and stretchable, which allows the resulting film to be oriented to a degree greater than previously thought possible.

The polymer composition may, for example, have a melt viscosity of from about 35 to about 500 Pa-s, in some embodiments from about 35 to about 250 Pa-s, in some embodiments from about 40 to about 200 Pa-s, and in some embodiments, from about 50 to about 100 Pa-s, determined at a shear rate of 400 seconds$^{-1}$. The polymer composition may also have a melt viscosity of from about 25 to about 150 Pa-s, in some embodiments from about 30 to about 125 Pa-s, and in some embodiments, from about 35 to about 100 Pa-s, determined at a shear rate of 1000 seconds$^{-1}$. Melt viscosity may be determined in accordance with ISO Test No. 11443 at 15° C. higher than the melting temperature of the composition. The polymer composition may also have a complex viscosity of about 5,000 Pa-s or less, in some embodiments about 2,500 Pa-s or less, and in some embodiments, from about 400 to about 1,500 Pa-s at angular frequencies ranging from 0.1 to 500 radians per second (e.g., 0.1 radians per second). The complex viscosity may be determined by a parallel plate rheometer at 15° C. above the melting temperature and at a constant strain amplitude of 1%.

The melt strength of the polymer composition can be characterized by the engineering stress and/or viscosity at a certain percent strain and at the melting temperature of the composition. As explained in more detail below, such testing may be performed in accordance with the ARES-EVF during which an extensional viscosity fixture ("EVF") is used on a rotational rheometer to allow the measurement of the material stress versus percent strain. In this regard, the present inventor has discovered that the polymer composition can have a relatively high maximum engineering stress even at relatively high percent strains. For example, the composition can exhibit its maximum engineering stress at a percent strain of from about 0.3% to about 1.5%, in some embodiments from about 0.4% to about 1.5%, and in some embodiments, from about 0.6% to about 1.2%. The maximum engineering stress may, for instance, range from about 340 kPa to about 600 kPa, in some embodiments from about 350 kPa to about 500 kPa, and in some embodiments, from about 370 kPa to about 420 kPa. Just as an example, at a percent strain of about 0.6%, the composition can exhibit a relatively high engineering stress of 340 kPa to about 600 kPa, in some embodiments from about 350 kPa to about 500 kPa, and in some embodiments, from about 360 kPa to about 400 kPa. The elongational viscosity may also range from about 350 kPa-s to about 1500 kPa-s, in some embodiments from about 500 kPa-s to about 1000 kPa-s, and in some embodiments, from about 600 kPa-s to about 900 kPa-s.

The composition can also have a relatively high storage modulus. The storage modulus of the composition, for instance, may be from about 1 to about 250 Pa, in some embodiments from about 2 to about 200 Pa, and in some embodiments, from about 5 to about 100 Pa, as determined at the melting temperature of the composition (e.g., about 360° C.) and at an angular frequency of 0.1 radians per second. The composition may also have a relatively high melting temperature. For example, the melting temperature of the polymer may be from about 300° C. to about 400° C., in some embodiments from about 320° C. to about 395° C., and in some embodiments, from about 340° C. to about 380° C.

Various embodiments of the present invention will now be described in further detail.

I. Polymer Composition

As indicated above, the composition contains a thermotropic liquid crystalline polymer or blend of such polymers to achieve the desired properties. Liquid crystalline polymers are generally classified as "thermotropic" to the extent that they can possess a rod-like structure and exhibit a crystalline behavior in its molten state (e.g., thermotropic nematic state). Such polymers may be formed from one or more types of repeating units as is known in the art. Liquid crystalline polymers may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (I):

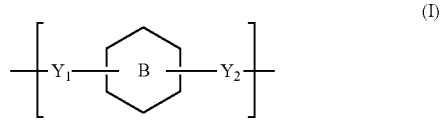

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 60 mol. %, in some embodiments from about 10 mol. % to about 55 mol. %, and in some embodiments, from about 15 mol. % to about 50 mol. % of a polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments, from about 25 mol. % to about 75 mol. % of a polymer.

Other repeating units may also be employed. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic dials may include, for instance, hydroquinone ("HQ") and 4,4'-biphenol ("BP"). When employed, repeating units derived from aromatic dials (e.g., HQ and/or BP) typically constitute from about 1 mol. % to about 30 mol. %, in some embodiments from about 2 mol. % to about 25 mol. %, and in some embodiments, from about 5 mol. % to about 20 mol. % of a polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10 mol. % of a polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, liquid crystalline polymers may be "low naphthenic" to the extent that they contain a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 30 mol. %, in some embodiments no more than about 15 mol. %, in some embodiments no more than about 10 mol. %, in some embodiments no more than about 8 mol. %, and in some embodiments, from 0 mol. % to about 5 mol. % of a polymer (e.g., 0 mol. %). Despite the absence of a high level of conventional naphthenic acids, it is believed that the resulting "low naphthenic" polymers are still capable of exhibiting good thermal and mechanical properties.

Liquid crystalline polymers may be prepared by initially introducing the aromatic monomer(s) used to form ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 250° C. to about 400° C., in some embodiments from about 280° C. to about 395° C., and in some embodiments, from about 290° C. to about 400° C. For instance, one suitable technique for forming the liquid crystalline polymer may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to from about 250° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. In some embodiments, the melt polymerized polymer may also be subjected to a subsequent solid-state polymerization method to further increase its molecular weight. Solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 250° C. to about 350° C. The polymerization time will of course vary based on the temperature and target molecular weight. In most cases, however, the solid-state polymerization time will be from about 2 to about 12 hours, and in some embodiments, from about 4 to about 10 hours.

As indicated above, one or more liquid crystalline polymers may be employed to achieve the desired properties of the resulting polymer composition. In certain embodiments, the polymer composition may be formed from a blend that contains a first liquid crystalline polymer and a second liquid crystalline polymer. The first polymer may be highly flowable and more liquid-like in nature, while the second polymer may be less flowable but have a higher degree of melt strength. By carefully controlling the relative concentration of such polymers, the resulting composition may be formed with the desired properties. For example, the first liquid crystalline polymer may constitute from about 10 wt. % to about 90 wt. %, in some embodiments from about 25 wt. % to about 75 wt. %, in some embodiments from about 35 wt. % to about 65 wt. %, and in some embodiments, from about 40 wt. % to about 60 wt. % of the polymer content of the composition, while the second liquid crystalline polymer may constitute from about 10 wt. % to about 90 wt. %, in some embodiments from about 25 wt. % to about 75 wt. %, in some embodiments from about 35 wt. % to about 65 wt. %, and in some embodiments, from about 40 wt. % to about 60 wt. % of the polymer content composition.

The highly flowable first liquid crystalline polymer may have a relatively low molecular weight as reflected by its melt viscosity. That is, the first liquid crystalline polymer may have a melt viscosity of from about 1 to about 60 Pa-s, in some embodiments from about 5 to about 50 Pa-s, and in some embodiments, from about 10 to about 40 Pa-s at a shear rate of 400 seconds$^{-1}$. The flowable first liquid crystalline polymer can be produced by a melt polymerization process, such as described above. The second liquid crystalline polymer may have a higher molecular weight than the first polymer. For example, the second liquid crystalline polymer may have a melt viscosity have a melt viscosity of from about 100 to about 1000 Pa-s, in some embodiments from about 200 to about 800 Pa-s, and in some embodiments, from about 300 to about 400 Pa-s at a shear rate of 400 seconds$^{-1}$. The second polymer can, for instance, be produced by melt polymerizing monomers to form a prepolymer, which is then solid-stated polymerized to the desired molecular weight as described above.

In terms of melt strength, the first liquid crystalline polymer typically exhibits a maximum engineering stress of only from about 0.1 to about 50 kPa, in some embodiments from about 0.5 to about 40 kPa, and in some embodiments, from about 1 to about 30 kPa. Nevertheless, the stronger, second liquid crystalline polymer may exhibit a maximum engineering stress of from about 150 kPa to about 370 kPa, in some embodiments from about 250 kPa to about 360 kPa, and in some embodiments, from about 300 kPa to about 350 kPa. Surprisingly, as noted above, the present inventors have discovered that the blended composition can actually have a higher maximum engineering stress than either of the individual polymers. Although not necessarily required, the first and second liquid crystalline polymers may each have a melting temperature within a range of from about 300° C. to about 400° C., in some embodiments from about 320° C. to about 395° C., and in some embodiments, from about 340° C. to about 380° C.

The first and second liquid crystalline polymers may have the same or different monomer constituents. In certain embodiments, for example, the polymers may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 10 mol. % to about 80 mol. %, in some embodiments from about 30 mol. % to about 75 mol. %, and in some embodiments, from about 45 mol. % to about 70 mol. % of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments, from about 15 mol. % to about 35 mol. % of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments, from about 5 mol. % to about 20 mol. % of the polymer. Other possible repeating units may include those derived from 6-hydroxy-2-naphthoic acid ("HNA"), 2,6-naphthalenedicarboxylic acid ("NDA"), and/or acetaminophen ("APAP"). For example, repeating units derived from HNA, NDA, and/or APAP may each constitute from about 1 mol. % to about 35 mol. %, in some embodiments from about 2 mol. % to about 30 mol. %, and in some embodiments, from about 3 mol. % to about 25 mol. % when employed. While the polymers may be formed from the same or similar monomer constituents, they may have different molecular weights as noted above.

II. Optional Additives

To maintain the desired properties, a substantial portion of the composition is generally formed from liquid crystalline polymers. That is, about 40 wt. % or more, in some embodiments about 60 wt. % or more, and in some embodiments, about 80 wt. % or more (e.g., 100 wt. %) of the composition is formed by liquid crystalline polymers. Nevertheless, the composition may optionally contain one or more additives if so desired, such as flow aids, antimicrobials, pigments, antioxidants, stabilizers, surfactants, waxes, solid solvents, flame retardants, anti-drip additives, and other materials added to enhance properties and processability. When employed, the optional additive(s) typically constitute from about 0.05 wt. % to about 60 wt. %, and in some embodiments, from about 0.1 wt. % to about 40 wt. %, and in some embodiments, from about 0.5 wt. % to about 20 wt. % of the composition.

Fibrous fillers, for instance, may be employed to help improve strength. Examples of such fibrous fillers may include those formed from glass, carbon, ceramics (e.g., alumina or silica), aramids (e.g., Kevlar® marketed by E.I. DuPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. Particulate fillers may also be employed in the polymer composition to help achieve the desired properties and/or color. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite ($(K, H_3O)(Al, Mg, Fe)_2(Si,Al)_4O_{10}[(OH)_2,(H_2O)]$), montmorillonite ($(Na, Ca)_{0.33}(Al, Mg)_2Si_4O_{10}(OH)_2 \cdot nH_2O$), vermiculite ($(MgFe, Al)_3(Al, Si)_4O_{10}(OH)_2 \cdot 4H_2O$), palygorskite ($(Mg, Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other particulate fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}$ (OH)$_2$), glauconite (K, Na)(Al, Mg, Fe)$_2$(Si,Al)$_4$O$_{10}$(OH)$_2$), etc., as well as combinations thereof.

Lubricants may also be employed that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide.

III. Films

Regardless of its particular constituents, any of variety of different techniques may generally be used to form the composition into a film. Suitable techniques may include, for instance, solvent casting, extrusion casting, blown film processes, etc. In one particular embodiment, a blown film process is employed in which the composition is fed to an extruder, where it is melt processed and then supplied through a blown film die to form a molten bubble. Typically, the die contains a mandrel that is positioned within the interior of an outer die body so that a space is defined therebetween. The polymer composition is blown through this space to form the bubble, which can then be drawn, inflated with air, and rapidly cooled so that the polymer composition quickly solidifies. If desired, the bubble may then be collapsed between rollers and optionally wound onto a reel.

Referring to FIG. 1, for instance, one embodiment of a blown film die 10 is illustrated in more detail. As shown, the die 10 contains a substantially cylindrical outer body 14 that has a hollow interior within which is positioned a substantially cylindrical mandrel 20. The outer body 14 is generally concentric with the mandrel 20, and also has an internal diameter that is greater than the outer diameter of the mandrel 20 so that an axial space 22 is defined therebetween. At least one bore 18 is also defined in the outer body 14 that defines a flow path to the axial space 22. In this manner, the bore 18 is aligned with an inlet 12 through which the melt processed liquid crystalline polymer composition is supplied (e.g., extruder). This allows the composition to flow through the inlet 12 and the bore 18 until it reaches the axial space 22. Within the space 22, the polymer composition is blown into a bubble 30, which can then be collapsed to form a film, drawn into the shape of a tube, etc.

The mandrel 20 may be stationary or it may be rotatable about a central longitudinal axis, such as in a clockwise direction as exemplified by the directional arrow shown in FIG. 1. Rotation of the mandrel 20 may result in a component of flow that extends perpendicular to the extrusion direction to blend the axial flow thereof uniformly around the interior of the die. A substantially uniform axial flow distribution of the molten polymer composition is thus achieved at a considerably lower melt pressure than required with static equipment. Rotation of the mandrel 20 also helps control the circumferential component flow of the melt can by adjustment of the speed of rotation, which allows substantially uniform axial flow to be obtained with a minimum of input of mechanical energy to the molten polymer composition. The outer die body 14 may likewise remain stationary or it may rotate in a direction that is the same or opposite to that of the mandrel 20. In particular embodiments, the outer die body 14 rotates in a direction opposite to that of the mandrel 20, such as in a counterclockwise direction as exemplified by the directional arrow shown in FIG. 1. Such a "counter-rotating" die configuration can allow the film to be biaxially stretched as it is formed. In such embodiments, as shown in FIG. 1, the outer die body 14 may contain a plurality of spaced apart bores 18 that can each register with the inlet 12 as the die body 14 rotates.

The thickness of the film formed from the composition of the present invention may vary, but is typically about 0.5 millimeters or less, in some embodiments from about 0.5 to about 400 micrometers, and in some embodiments, from about 1 to about 100 micrometers. The film is generally impervious to gases and moisture due to the presence of the liquid crystalline polymer composition. For example, the film may be impervious to gases in that it prevents the mass transfer of gases at typical atmospheric conditions, such as oxygen, carbon dioxide or nitrogen. Oxygen barrier properties, for instance, are typically measured in g/m$^2$-24 hr. In the present invention, the film may have an oxygen transmission rate of about 0.3 g/m$^2$-24 hr or less, in some embodiments about 0.2 g/m$^2$-24 hr or less, and in some embodiments, about 0.1 g/m$^2$-24 hr or less, as determined in accordance with ASTM D3985-05 at a temperature of 23° C. and a relative humidity of 0%. The resistance to the mass transfer of liquid vapors at a certain partial pressure and temperature across a material can be expressed as the moisture vapor transmission rate with the units of g/m$^2$-24 hr. In the present invention, the film may have a moisture vapor transmission rate of about 0.2 g/m$^2$-24 hr or less, in some embodiments about 0.1 g g/m$^2$-24 hr or less, and in some embodiments, about 0.05 g/m$^2$-24 hr or less, determined in accordance with ASTM F1249-06 at a temperature of 100° F. and 90% relative humidity.

The tensile and flexural mechanical properties of the film may also be good. For example, the film may exhibit a flexural strength of from about 20 to about 500 MPa, in some embodiments from about 40 to about 200 MPa, and in some embodiments, from about 50 to about 150 MPa; a flexural break strain of about 0.5% or more, in some embodiments from about 0.6% to about 10%, and in some embodiments, from about 0.8% to about 3.5%; and/or a flexural modulus of from about 2,000 MPa to about 20,000 MPa, in some embodiments from about 3,000 MPa to about 20,000 MPa, and in some embodiments, from about 4,000 MPa to about 15,000 MPa. The flexural properties may be determined in accordance with ISO Test No. 178 (technically equivalent to ASTM D790-98) at 23° C. The tensile strength may also be from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 5,000 MPa to about 20,000 MPa, in some embodiments from about 8,000 MPa to about 20,000 MPa, and in some embodiments, from about 10,000 MPa to about 15,000 MPa. The tensile properties may be determined in accordance with ISO Test No. 527 (technically equivalent to ASTM D638) at 23° C.

Due to its unique properties, the resulting film may be used as a stand-alone product or incorporated into other types of products. For example, the film can be used in a stand-alone form as a shrink film, cling film, stretch film, sealing film, etc., or to form a package for food products (e.g., snack packaging, heavy duty bags, grocery sacks, baked and frozen food packaging, etc.), packaging for medical products, packaging for biological materials, packaging for electronic devices, etc. The film can also be formed into a laminate material having a variety of different uses, such as in claddings, multi-layer print wiring boards for semiconductor package and mother boards, flexible printed circuit board, tape automated bonding, tag tape, for electromagnetic waves, probe cables, communication equipment circuits, etc. In one particular embodiment, a laminate is employed in a flexible printed circuit board that contains a conductive layer and a film formed as described herein. The conductive layer may be in the form of a metal plate or foil, such as those containing gold, silver, copper, nickel, aluminum, etc. (e.g., copper foil). The film may be applied to the conductive layer using known techniques, or the conductive layer may alternatively be applied to the film using techniques such as ion beam sputtering, high frequency sputtering, direct current magnetron sputtering, glow discharge, etc. If desired, the film may be subjected to a surface treatment on a side facing the conductive layer so that the adhesiveness between the film and conductive layer is improved. Examples of such surface treatments include, for instance, corona discharge treatment, UV irradiation treatment, plasma treatment, etc. Adhesives may also be employed between the film and the conductive layer as is known in the art. Suitable adhesives may include epoxy, phenol, polyester, nitrile, acryl, polyimide, polyurethane resins, etc. The resulting laminate may have a two-layer structure containing only the film and conductive layer. Alternatively, a multi-layered laminate may be formed, such as a three-layer structure in which conductive layers are placed on both sides of a film, a five-layer structure in which films and conductive layers are alternately stacked, and so forth. Regardless of the number of layers, various conventional processing steps may be employed to provide the laminate with sufficient strength. For example, the laminate may be pressed and/or subjected to heat treatment as is known in the art.

A variety of different techniques may be employed to form a printed circuit board from such a laminate structure. In one embodiment, for example, a photo-sensitive resist is initially disposed on the conductive layer and an etching step is thereafter performed to remove a portion of the conductive layer. The resist can then be removed to leave a plurality of conductive pathways that form a circuit. If desired, a cover film may be positioned over the circuit, which may also be formed in accordance with the present invention. Regardless of how it is formed, the resulting printed circuit board can be employed in a variety of different electronic components. As an example, flexible printed circuit boards may be employed in desktop computers, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, etc. Of course, the polymer composition may also be employed in electronic components, such as described above, in devices other than printed circuit boards. For example, the polymer composition may be used to form high density magnetic tapes, wire covering materials, etc.

The present invention may be better understood with reference to the following examples.

Test Methods

Melt Viscosity: The melt viscosity (Pa-s) may be determined in accordance with ISO Test No. 11443 at a shear rate of 1000 s$^{-1}$ and temperature 15° C. above the melting temperature (e.g., about 375° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Complex Viscosity: Complex viscosity is a frequency-dependent viscosity, determined during forced harmonic oscillation of shear stress at angular frequencies of 0.1 to 500 radians per second. Prior to testing, the sample is cut into the shape of a circle (diameter of 25 mm) using a hole-punch. Measurements are determined at a temperature 15° C. above the melting temperature (e.g., about 375° C.) and at a constant strain amplitude of 1% using an ARES-G2 rheometer (TA Instruments) with a parallel plate configuration (25 mm plate diameter). The gap distance for each sample is adjusted according to the thickness of each sample.

Melting Temperature: The melting temperature ("Tm") was determined by differential scanning calorimetry ("DSC") as is known in the art. The melting temperature is the differential scanning calorimetry (DSC) peak melt temperature as determined by ISO Test No. 11357. Under the DSC procedure, samples were heated and cooled at 20° C. per minute as stated in ISO Standard 10350 using DSC measurements conducted on a TA Q2000 Instrument.

Melt Elongation: Melt elongation properties (i.e., stress, strain, and elongational viscosity) may be determined in accordance with the ARES-EVF: Option for Measuring Extensional Velocity of Polymer Melts, A. Franck, which is incorporated herein by reference. In this test, an extensional viscosity fixture ("EVF") is used on a rotational rheometer to allow the measurement of the engineering stress at a certain percent strain. More particularly, a thin rectangular polymer melt sample is adhered to two parallel cylinders: one cylinder rotates to wind up the polymer melt and lead to continuous uniaxial deformation in the sample, and the other cylinder measures the stress from the sample. An exponential increase in the sample length occurs with a rotating cylinder. Therefore, the Hencky strain ($\epsilon_H$) is determined as function of time by the following equation: $\epsilon_H(t)=\ln(L(t)/L_o)$, where $L_o$ is the initial gauge length of and $L(t)$ is the gauge length as a function of time. The Hencky strain is also referred to as percent strain. Likewise, the elongational viscosity is determined by dividing the normal stress (kPa) by the elongation rate (s$^{-1}$). Specimens tested according to this procedure have a width of 1.27 mm, length of 30 mm, and thickness of 0.8 mm. The test may be conducted at the melting temperature (e.g., about 360° C.) and elongation rate of 2 s$^{-1}$.

Water Vapor Transmission Rate ("WVTR"):

The water vapor transmission rate is determined in accordance with ASTM F1249 at a temperature of 37.7° C. and relative humidity of 90%. In this method, a dry chamber is separated from a wet chamber of known temperature and humidity by the barrier material to be tested. Water vapor diffusing through the film mixes with the gas in the dry chamber and is carried to a pressure-modulated infrared sensor. The sensor measures the fraction of infrared energy absorbed by the water vapor and produces an electrical signal, the amplitude of which is proportional to water vapor concentration. The amplitude of the electrical signal produced by the test film is then compared to the signal produced by measurement of a calibration film of known water vapor transmission rate. This information is then used to calculate the rate at which moisture is transmitted through the material being used. A foil mask is used to mount the sample with a circular size of 50 cm². It consists of two square pieces of adhesive backed foil with circular cut-outs in the center. The sample is placed between the two pieces, attached by the adhesive. The cut out is 50 cm² in size.

Oxygen Transmission Rate: The oxygen transmission rate is determined in accordance with ASTM D3985 at a temperature of 23° C. and relative humidity of 0%. In this test, the oxygen gas transmission rate is determined after the sample has equilibrated in a dry test environment, which is considered to be one in which the relative humidity is less than 1%. The specimen is mounted as a sealed semi-barrier between two chambers at ambient atmospheric pressure. One chamber is slowly purged by a stream of nitrogen and the other chamber contains oxygen. As oxygen gas permeates through the film into the nitrogen carrier gas, it is transported to the coulometric detector where it produces an electrical current, proportional to the amount of oxygen flow rate into the detector.

EXAMPLE

A high molecular weight LCP and a low molecular weight LCP are employed in this Example. Both of the polymers are formed from 60.1% of 4-hydroxybenzoic acid ("HBA"), 3.5% of 2,6-hydroxynaphthoic acid ("HNA"), 18.2% of terephthalic acid ("TA"), 13.2% of 4,4'-biphenol ("BP"), and 5% of acetaminophen ("APAP"), such as described in U.S. Pat. No. 5,508,374 to Lee, et al. The high molecular weight grade is formed by solid-state polymerizing the low molecular weight polymer until the desired molecular weight (e.g., melting temperature and melt viscosity) are achieved.

Figure 2:
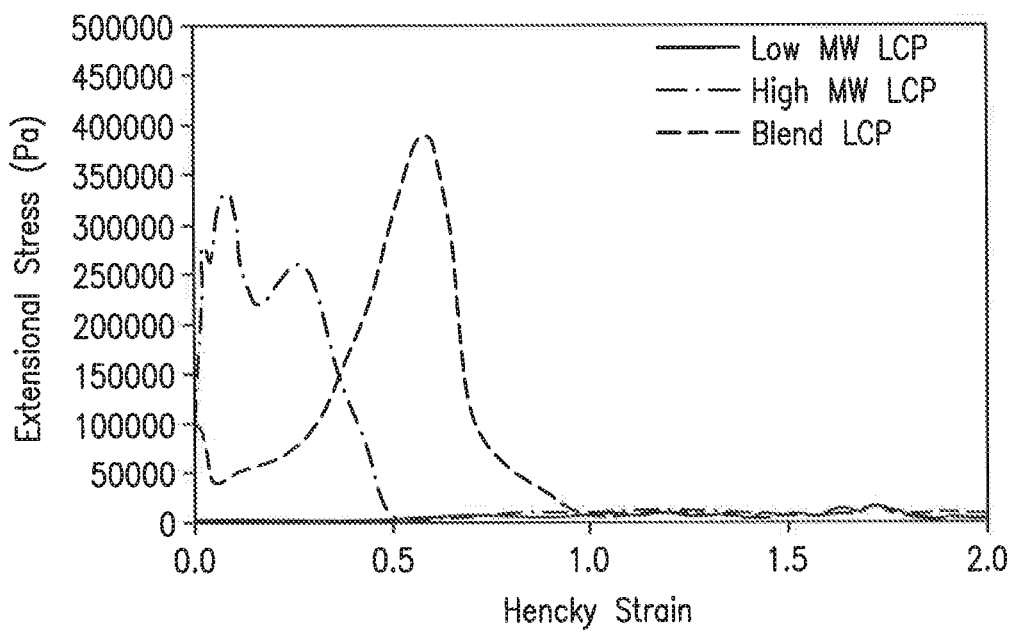
FIG. 2 is a graph depicting the engineering stress versus strain for the samples in the Example.
Figure 3:
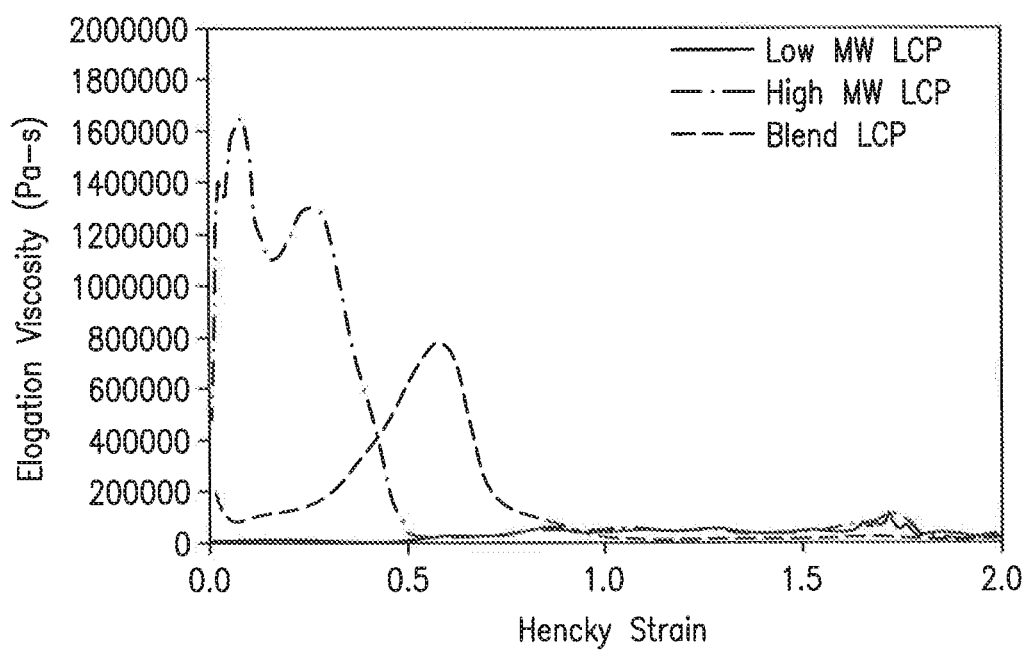
FIG. 3 is a graph depicting the elongational viscosity versus strain for the samples in the Example.

Three (3) pellet samples are formed from the LCP polymers as follows: Sample 1 (low molecular weight LCP); Sample 2 (high molecular weight LCP); and Sample 3 (blend of 50 wt. % of the low molecular weight LCP and 50 wt. % of the high molecular weight LCP). To form the samples, pellets of the liquid crystalline polymers are dried at 150° C. overnight. Thereafter, the polymers are supplied to the feed throat of a ZSK-25 WLE co-rotating, fully intermeshing twin screw extruder in which the length of the screw is 750 millimeters, the diameter of the screw is 25 millimeters, and the L/D ratio is 30. The extruder has temperature zones 1-9, which may be set to the following temperatures: 330° C., 330° C., 310° C., 310° C., 310° C., 310° C., 320° C., 320° C., and 320° C., respectively. Once melt blended, the samples are extruded through a single-hole strand die, cooled through a water bath, and pelletized. The melt viscosity viscosity and melting temperature of the samples are set forth below in Table 1. The rheological properties of the polymer pellets are also set forth below in Tables 2-4. The melt elongation properties are also set forth in FIGS. 2-3.

TABLE 1

Melt Viscosity and Melting Temperature

|  | Blend | High MW LCP | Low MW LCP |
|---|---|---|---|
| Melt Viscosity (at 1000/sec, ~375° C.) (Pa-s) | 42.4 | 173.7 | 22.8 |
| Melt Viscosity (at 400/s, ~375° C.) (Pa-s) | 70.1 | 368.4 | 33.3 |
| Melting Temperature (° C.) | 357 | 356 | 358 |

TABLE 1-continued

Melt Viscosity and Melting Temperature

|  | Blend | High MW LCP | Low MW LCP |
|---|---|---|---|

TABLE 2

Rheological Behavior of Low MW LCP Sample

| Angular frequency rad/s | Storage modulus Pa | Loss modulus Pa | Complex viscosity Pa·s |
|---|---|---|---|
| 0.1 | 26.9 | 48.8 | 557.1 |
| 0.2 | 46.0 | 70.7 | 532.2 |
| 0.3 | 64.9 | 103.0 | 484.8 |
| 0.4 | 85.4 | 151.1 | 436.1 |
| 0.6 | 126.8 | 197.6 | 372.1 |
| 1.0 | 156.6 | 269.7 | 311.9 |
| 1.6 | 220.2 | 375.1 | 274.4 |
| 2.5 | 316.0 | 524.6 | 243.8 |
| 4.0 | 433.5 | 699.1 | 206.6 |
| 6.3 | 622.7 | 950.5 | 180.1 |
| 10.0 | 892.3 | 1253.5 | 153.9 |
| 15.8 | 1254.2 | 1613.7 | 129.0 |
| 25.1 | 1721.3 | 2041.6 | 106.3 |
| 39.8 | 2290.5 | 2541.2 | 85.9 |
| 63.1 | 2994.3 | 3132.1 | 68.7 |
| 100.0 | 3809.4 | 3892.6 | 54.5 |
| 158.5 | 4842.2 | 4819.9 | 43.1 |
| 251.2 | 6116.7 | 6018.9 | 34.2 |
| 398.1 | 7587.8 | 7566.2 | 26.9 |
| 500.0 | 8570.5 | 8544.3 | 24.2 |

TABLE 3

Rheological Behavior of High MW LCP Sample

| Angular frequency rad/s | Storage modulus Pa | Loss modulus Pa | Complex viscosity Pa·s |
|---|---|---|---|
| 0.1 | 527.1 | 1331.3 | 14318.5 |
| 0.2 | 738.0 | 1921.6 | 12987.6 |
| 0.3 | 1025.9 | 2813.6 | 11922.6 |
| 0.4 | 1464.3 | 4151.4 | 11057.6 |
| 0.6 | 2237.2 | 6113.4 | 10317.5 |
| 1.0 | 3605.7 | 8865.6 | 9570.8 |
| 1.6 | 6011.0 | 12467.2 | 8732.8 |
| 2.5 | 9907.6 | 16674.7 | 7721.7 |
| 4.0 | 15649.0 | 20994.1 | 6577.3 |
| 6.3 | 23076.5 | 24761.9 | 5364.5 |
| 10.0 | 31740.7 | 27518.1 | 4200.9 |
| 15.8 | 40941.3 | 29113.5 | 3169.8 |
| 25.1 | 50089.8 | 29833.2 | 2321.0 |
| 39.8 | 58867.2 | 30167.9 | 1661.5 |
| 63.1 | 67307.2 | 30645.9 | 1172.1 |
| 100.0 | 75674.6 | 31670.9 | 820.3 |
| 158.5 | 84209.9 | 33514.4 | 571.9 |
| 251.2 | 93525.6 | 36287.3 | 399.4 |
| 398.1 | 103797.0 | 39789.3 | 279.2 |
| 500.0 | 109454.0 | 41872.7 | 234.4 |

TABLE 4

Rheological Behavior of Blended Sample

| Angular frequency rad/s | Storage modulus Pa | Loss modulus Pa | Complex viscosity Pa·s |
|---|---|---|---|
| 0.1 | 18.1 | 59.4 | 620.9 |
| 0.2 | 42.1 | 90.0 | 627.1 |
| 0.3 | 66.5 | 117.4 | 537.1 |
| 0.4 | 94.8 | 143.9 | 432.8 |
| 0.6 | 127.2 | 201.2 | 377.3 |

TABLE 4-continued

Rheological Behavior of Blended Sample

| Angular frequency rad/s | Storage modulus Pa | Loss modulus Pa | Complex viscosity Pa·s |
|---|---|---|---|
| 1.0 | 162.9 | 274.5 | 319.2 |
| 1.6 | 224.3 | 394.3 | 286.2 |
| 2.5 | 301.8 | 553.4 | 251.0 |
| 4.0 | 409.6 | 770.4 | 219.2 |
| 6.3 | 616.0 | 1070.6 | 195.8 |
| 10.0 | 909.1 | 1440.5 | 170.3 |
| 15.8 | 1321.0 | 1882.2 | 145.1 |
| 25.1 | 1856.1 | 2385.5 | 120.3 |
| 39.8 | 2540.0 | 2974.6 | 98.3 |
| 63.1 | 3351.3 | 3684.6 | 78.9 |
| 100.0 | 4313.7 | 4519.3 | 62.5 |
| 158.5 | 5479.1 | 5598.1 | 49.4 |
| 251.2 | 6954.4 | 6976.8 | 39.2 |
| 398.1 | 8643.2 | 8751.6 | 30.9 |
| 500.0 | 9673.2 | 9768.0 | 27.5 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A film comprising a polymer composition that includes a thermotropic liquid crystalline polymer, wherein the polymer composition has a melt viscosity of from about 35 to about 500 Pa-s, as determined in accordance with ISO Test No. 11443 at 15° C. higher than the melting temperature of the composition and at a shear rate of 400 seconds$^{-1}$, and wherein the composition exhibits a maximum engineering stress of from about 340 kPa to about 600 kPa, as determined at the melting temperature of the composition with an extensional viscosity fixture and a rotational rheometer, and further wherein the melting temperature of the composition is from about 300° C. to about 400° C.

2. The film of claim 1, wherein the polymer composition has a melt viscosity of from about 35 to about 250 Pa-s, as determined in accordance with ISO Test No. 11443 at 15° C. higher than the melting temperature of the composition and at a shear rate of 400 seconds$^{-1}$.

3. The film of claim 1, wherein the polymer composition has a complex viscosity of about 5,000 Pa-s or less at angular frequencies ranging from 0.1 to 500 radians per second, as determined by a parallel plate rheometer at 15° C. above the melting temperature and at a constant strain amplitude of 1%.

4. The film of claim 1, wherein the polymer composition exhibits a maximum engineering stress at a percent strain of from about 0.3% to about 1.5%, as determined at the melting temperature of the composition with an extensional viscosity fixture and a rotational rheometer.

5. The film of claim 1, wherein the polymer composition exhibits an elongational viscosity of from about 350 kPa-s to about 1500 kPa-s, as determined at the melting temperature of the composition with an extensional viscosity fixture and a rotational rheometer.

6. The film of claim 1, wherein the polymer composition exhibits a storage modulus of from about 1 to about 250 Pa as determined at the melting temperature of the composition and at an angular frequency of 0.1 rad/s.

7. The film of claim 1, wherein the thermotropic liquid crystalline polymer contains aromatic ester repeating units, the aromatic ester repeating units including aromatic dicarboxylic acid repeating units, aromatic hydroxycarboxylic acid repeating units, and aromatic diol repeating units.

8. The film of claim 7, wherein the aromatic hydroxycarboxylic acid repeating units are derived from 4-hydroxybenzoic acid, 6-hydroxy-2-naphthoic acid, or a combination thereof, the aromatic dicarboxylic acid repeating units are derived from terephthalic acid, isophthalic acid, or a combination thereof, and the aromatic diol repeating units are derived from hydroquinone, 4,4'-biphenol, or a combination thereof.

9. The film of claim 1, wherein a first liquid crystalline polymer constitutes from about 10 wt. % to about 90 wt. % of the polymer content of the composition and the second liquid crystalline polymer constitutes from about 10 wt. % to about 90 wt. % of the polymer content of the composition.

10. The film of claim 9, wherein the first liquid crystalline polymer has a melt viscosity of from about 1 to about 60 Pa-s and the second liquid crystalline polymer has a melt viscosity of from about 100 to about 1000 Pa-s, as determined in accordance with ISO Test No. 11443 at 15° C. higher than the melting temperature of the composition and at a shear rate of 400 seconds$^{-1}$.

11. The film of claim 9, wherein the first liquid crystalline polymer has a maximum engineering stress of from about 0.1 to about 50 kPa and the second liquid crystalline polymer has a maximum engineering stress of from about 150 to about 370 kPa, as determined at the melting temperature of the composition with an extensional viscosity fixture and a rotational rheometer.

12. The film of claim 9, wherein the first liquid crystalline polymer is produced by melt polymerization and the second liquid crystalline polymer is produced by solid-state polymerization.

13. The film of claim 9, wherein the first liquid crystalline polymer and the second liquid crystalline polymer are formed from repeating units derived from 4-hydroxybenzoic acid in an amount from about 10 mol. % to about 80 mol. %, repeating units derived from terephthalic acid and/or isophthalic acid in an amount from about 5 mol. % to about 40 mol. %, and repeating units derived from 4,4'-biphenol and/or hydroquinone in an amount from about 1 mol. % to about 30 mol. %.

14. The film of claim 1, wherein the film has an oxygen transmission rate of about 0.3 g/m$^2$-24 hr or less, as determined in accordance with ASTM D3985-05 at a temperature of 23° C. and a relative humidity of 0%.

15. The film of claim 1, wherein the film has a moisture vapor transmission rate of about 0.2 g/m$^2$-24 hr or less, as determined in accordance with ASTM F1249-06 at a temperature of 100° F. and 90% relative humidity.

16. A method for forming a film, the method comprising:
melt processing a polymer composition that includes a thermotropic liquid crystalline polymer, wherein the polymer composition has a melt viscosity of from about 35 to about 500 Pa-s, as determined in accordance with ISO Test No. 11443 at 15° C. higher than the melting temperature of the composition and at a shear rate of 400 seconds$^{-1}$, and wherein the composition exhibits a maximum engineering stress of from about 340 kPa to about 600 kPa, as determined at the melting temperature of the composition with an extensional viscosity fixture and a rotational rheometer, and further wherein the melting temperature of the composition is from about 300° C. to about 400° C.;

supplying the melt processed composition to a die;
blowing the melt processed composition into a bubble within the die, which is then collapsed to form the film.

17. The method of claim 16, wherein a first liquid crystalline polymer constitutes from about 10 wt. % to about 90 wt. % of the polymer content of the composition and the second liquid crystalline polymer constitutes from about 10 wt. % to about 90 wt. % of the polymer content of the composition.

18. The method of claim 16, wherein the die contains a mandrel that is positioned within the interior of an outer die body so that a space is defined therebetween, the polymer composition being blown through the space to form the bubble.

19. The method of claim 17, wherein outer body is generally concentric with the mandrel.

20. The method of claim 17, wherein the mandrel is rotatable about a central longitudinal axis.

21. The method of claim 17, wherein the outer die body is rotatable about a central longitudinal axis.

22. The method of claim 17, wherein the mandrel and the outer die body are rotatable about a central longitudinal axis in opposite directions.

* * * * *